United States Patent
Cadle-Davidson et al.

(10) Patent No.: US 11,370,721 B2
(45) Date of Patent: Jun. 28, 2022

(54) FUNCTIONAL PARTICLES FOR DELIVERY OF BENEFICIAL AGRICULTURAL COMPONENTS

(71) Applicant: Advanced Biological Marketing, Inc., Geneva, NY (US)

(72) Inventors: Molly Cadle-Davidson, Geneva, NY (US); Robert Patrick, Waterloo, NY (US)

(73) Assignee: Advanced Biological Marketing, Inc., Geneva, NY (US)

( * ) Notice: Subject to any disclaimer, the term of this patent is extended or adjusted under 35 U.S.C. 154(b) by 176 days.

(21) Appl. No.: 16/717,651

(22) Filed: Dec. 17, 2019

(65) Prior Publication Data
US 2020/0199037 A1 Jun. 25, 2020

Related U.S. Application Data

(60) Provisional application No. 62/781,773, filed on Dec. 19, 2018.

(51) Int. Cl.
C05G 5/30 (2020.01)
C05F 11/08 (2006.01)
A01C 1/06 (2006.01)

(52) U.S. Cl.
CPC ............ *C05G 5/30* (2020.02); *A01C 1/06* (2013.01); *C05F 11/08* (2013.01)

(58) Field of Classification Search
None
See application file for complete search history.

(56) References Cited

U.S. PATENT DOCUMENTS 3,323,898 A * 6/1967 Harold ............... C05G 3/44
71/64.07
10,870,608 B1 * 12/2020 Smith ............... C10B 53/02
(Continued)

FOREIGN PATENT DOCUMENTS

| WO | 9733472 A1 | 9/1997 |
| WO | 2012161726 A1 | 11/2012 |
| WO | 2016113665 A1 | 7/2016 |

OTHER PUBLICATIONS

International Search Report regarding related PCT Application No. PCT/US2019/067095, dated Apr. 1, 2020.

*Primary Examiner* — Wayne A Langel
(74) *Attorney, Agent, or Firm* — Reising Ethington P.C.

(57) ABSTRACT

Disclosed is a functionalized particle having at its core a porous particle that acts as a structured support element. This porous particle is surrounded by a protective sealant layer encasing the porous particle. The particle includes a plurality of pores holding a first beneficial agricultural component. The functionalized particle can also include a plurality of functionalized molecules embedded in the sealant layer. The functionalized molecules comprise a base material, comprising an active agricultural component or an inactive material, and an active second beneficial agricultural component. The functionalized molecules can all contain the same base material and the same active second beneficial agricultural component or a mixture of different base materials and a mixture of second beneficial agricultural components. The first and second beneficial agricultural components can either be single components or a mixture of components and may be the same or different from each other.

19 Claims, 4 Drawing Sheets

(56) References Cited

U.S. PATENT DOCUMENTS

| | | | | |
|---|---|---|---|---|
| 2006/0003893 A1* | 1/2006 | Pursell | ............ | C05C 9/02 504/116.1 |
| 2008/0236033 A1* | 10/2008 | Sun | ............ | C05G 5/40 47/1.4 |
| 2014/0235438 A1* | 8/2014 | Thompson | ............ | C05G 3/60 504/100 |
| 2015/0128672 A1* | 5/2015 | Shearer | ............ | C05F 11/04 71/24 |
| 2017/0174578 A1* | 6/2017 | Belcher | ............ | C12N 1/20 |
| 2017/0332629 A1 | 11/2017 | Rametsteiner | | |
| 2019/0256431 A1* | 8/2019 | Zaseybida | ............ | C05D 1/04 |

* cited by examiner

XXX refers
to the Fungicide/Insecticide
mixture

FUNCTIONAL PARTICLES FOR DELIVERY OF BENEFICIAL AGRICULTURAL COMPONENTS

CROSS-REFERENCE TO RELATED APPLICATIONS

This application claims the benefit of U.S. Provisional Patent Application Ser. No. 62/781,773, filed on Dec. 19, 2018, which is incorporated herein by reference in its entirety.

STATEMENT REGARDING FEDERALLY SPONSORED RESEARCH

None.

STATEMENT REGARDING PARTIES TO A JOINT RESEARCH AGREEMENT

None.

REFERENCE TO SEQUENCING LISTING, TABLE OR COMPUTER PROGRAM LISTING

None.

STATEMENT REGARDING PRIOR DISCLOSURES BY THE INVENTOR OR A JOINT INVENTOR UNDER 33 C.F.R 1.77(B)(6)

None.

FIELD OF THE DISCLOSURE

This present disclosure relates generally to agriculture, and more particularly to functionalized particles and methods of using them to provide beneficial agricultural components to plants, especially crop plants.

BACKGROUND OF THE DISCLOSURE

This section provides background information which is not necessarily prior art to the inventive concepts associated with the present disclosure.

Despite advances in crop management and treatment methods there is a continuing need to develop additional methods and products to enhance crop growth and production. Over the past few years there has been increasing evidence that addition of microbes and their products to seeds or plant can enhance the growth, health and production of the treated plants.

It is desirable to provide methods and products that make it easier to provide beneficial agricultural components to plants and their seeds. The present invention is directed to providing solutions to these issues.

SUMMARY OF THE DISCLOSURE

This section provides a general summary of the present disclosure and is not intended to be interpreted as a comprehensive disclosure of its full scope or all features, aspects and objectives.

One aspect of the present disclosure is to provide functionalized particles that can be used to deliver beneficial agricultural components to plants either as a seed coating or by being applied to the plant via any of the known application methods. These beneficial agricultural components can comprise a variety of components including, but not limited to, viable microorganisms, nutrients, functional molecules and combinations of these. In addition, the functionalized particles can be used to do the following: provide protection for living organisms such as the microorganisms; protect fragile functional molecules from degradation, prevent toxicity and prevent environmental damage; and stabilize volatile beneficial agricultural components. The beneficial microorganisms include, alone or in combinations, *Trichoderma* spp., *Bacillus* spp., *Rhizobia* spp., *Bradyrhizobium* spp., *Burkholderia* spp., *Pseudomonas* spp., *Xanthomonas* spp., *Streptomyces* spp., *Azosporillum* spp., *Clonostachys* spp., other gram negative bacteria, other gram positive bacteria and mixtures thereof. Beneficial agricultural nutrients include fertilizer mixtures, micronutrients, humic acids, fulvic acids, salts, peat extract, other plant nutrients known in the art and combinations of these. The functional molecules can include chitosan, microbial metabolites, plant signal molecules, plant signal hormones, dsRNA, antisenseRNA, nucleic acids, proteins, plant extracts, microbial extracts, spent microbial media, microbial signal molecules, biofunctional molecules, effector molecules, virus particles, plasmids, stabilized macromolecules, chelators, buffers, other functional molecules and combinations of these.

In another embodiment the present invention comprises a functionalized particle having at its core a porous particle that acts as a structured support element. This porous particle is surrounded by a protective sealant layer that fully encases the porous particle. The particle includes a plurality of pores which hold a first beneficial agricultural component, this first beneficial agricultural component can comprise one or more of the beneficial agricultural components disclosed herein. The functionalized particle can also include a plurality of functionalized molecules embedded in the protective sealant layer. The functionalized molecules comprise a base material, which can either be another active agricultural component or it may be inactive, and an active second beneficial agricultural component. The functionalized molecules can all contain the same base material and the same active second beneficial agricultural component or a mixture of different base materials and a mixture of active second beneficial agricultural components. The first and second beneficial agricultural components can either be single components or a mixture of components and may be the same or different from each other.

These and other features and advantages of this disclosure will become more apparent to those skilled in the art from the detailed description herein. The drawings that accompany the detailed description are described below.

BRIEF DESCRIPTION OF THE DRAWINGS

The drawings described herein are for illustrative purposes only of selected aspects and not all possible implementations. These are not intended to limit the present disclosure to only that actually shown. With this in mind, various features and advantages of example aspects of the present disclosure will become apparent to one possessing ordinary skill in the art from the following written description and appended claims when considered in combination with the appended drawings, in which:

DETAILED DESCRIPTION OF THE DISCLOSURE

In the following description, details are set forth to provide an understanding of the present disclosure.

For clarity purposes, example aspects are discussed herein to convey the scope of the disclosure to those skilled in the relevant art. Numerous specific details are set forth such as examples of specific components, devices, and methods, in order to provide a thorough understanding of various aspects of the present disclosure. It will be apparent to those skilled in the art that specific details need not be discussed herein, such as well-known processes, well-known device structures, and well-known technologies, as they are already well understood by those skilled in the art, and that example embodiments may be embodied in many different forms and that neither should be construed to limit the scope of the disclosure.

The terminology used herein is for the purpose of describing particular example aspects only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
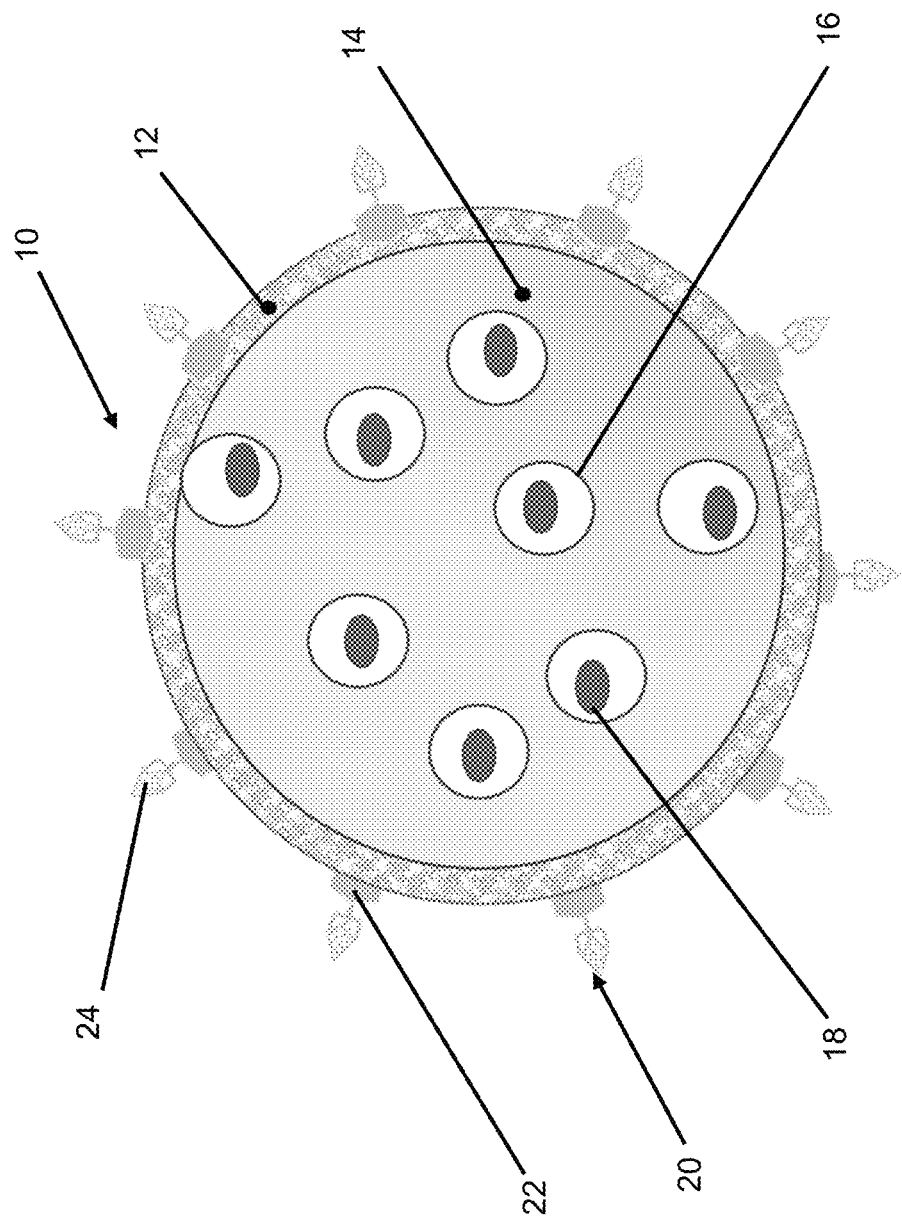
FIG. 1 is a cross-sectional schematic diagram of a functionalized particle in accordance with the present invention.

The present invention is directed to creating a functionalized particle as a delivery vehicle to deliver beneficial agricultural components to plants, especially crop plants. Referring in more detail to the drawings, FIG. 1 shows a cross-sectional schematic diagram of a functionalized particle 10 according to the present invention. The functionalized particle 10 has at its core a porous particle 14 that acts as a structured support element. This porous particle 14 is surrounded by a protective sealant layer 12 that fully encases the porous particle 14. The particle 14 includes a plurality of pores 16 which hold a first beneficial agricultural component 18, this first beneficial agricultural component can either be a single component or can comprise a plurality of beneficial agricultural components disclosed herein. The functionalized particle 10 can also include a plurality of functionalized molecules 20 embedded in the protective sealant layer 12. The functionalized molecules 20 comprise a base material 22, which can either be another active agricultural component or it may be an inactive material, and an active second beneficial agricultural component 24. The functionalized molecules 20 can all contain the same base material 22 and the same active second beneficial agricultural component 24 or a mixture of different base materials 22 and a mixture of active second beneficial agricultural components 24. The first and second beneficial agricultural components can be either a single agricultural component or a mixture of components and may be the same or different from each other.

The porous particle 14 can be any of a variety of porous structural support materials, including perlite, having pores, passages and tunnels within its structure. The porous particle 14 preferably has a diameter of 15 microns or less if the functionalized particle 10 is to be applied to seeds. If the functionalized particle 10 is to be applied to plants in furrows, via foliar spray, via broadcast application, in a granular formulation combined with a fertilizer or other agricultural treatments or applied by any means other than application to seeds then the porous particle 14 can have a diameter larger than 15 microns. When applied in this format the functionalized particle 10 just needs to have a size small enough to be able to pass through the application equipment.

The protective sealant layer 12 can be any of a variety of sealing materials including, but not limited to: corn starch or other starches; carrageenan, alginate, guar gum, agar, gelatin, polyacrylamide, wax, oil, natural polymers, synthetic polymers and mixtures thereof. The protective sealant layer can also include $CaCl_2$) in the coating solution when the sealant layer is formed from a carrageenan, as is known in the art calcium helps in the gelling of carrageenan. The protective sealant layer 12 functions to protect the first beneficial agricultural component 18 while still allowing the first beneficial agricultural component 18 to interact with the environment and the plant or seed over time. The protective sealant layer 12 also has to hold the optional functionalized molecule 20.

The first and second beneficial agricultural components, 18 and 24, can be any of a variety of beneficial agricultural components or a mixture of beneficial agricultural components. These beneficial agricultural components include but are not limited to, viable microorganisms, nutrients, functional molecules, and mixtures of these components. In addition, the functionalized particles 10 can: provide protection for living organisms such as the microorganisms; protect fragile functional molecules from degradation, prevent toxicity and prevent environmental damage; and stabilize volatile beneficial agricultural components. The beneficial microorganisms can include, alone or in combination, *Trichoderma* spp., *Bacillus* spp *Rhizobia* spp *Bradyrhizobium* spp *Burkholderia* spp *Pseudomonas* spp *Xanthomonas* spp., *Streptomyces* spp *Azosporillum* spp., *Clonostachys* spp., other gram negative bacteria, other gram positive bacteria and mixtures thereof. Beneficial agricultural nutrients include, but are not limited to, fertilizer mixtures, micronutrients, humic acids, fulvic acids, salts, peat extract, other nutrients known in the art and mixtures thereof. The functional molecules can include, but are not limited to, chitosan, microbial metabolites, plant signal molecules, plant signal hormones, dsRNA and antisenseRNA, nucleic acids, proteins, plant extracts, microbial extracts, spent microbial media, microbial signal molecules, biofunctional molecules, effector molecules, virus particles, plasmids, stabilized macromolecules, chelators, buffers, other functional molecules and mixtures thereof. The functionalized particles 10 can include any combination of these beneficial agricultural components. In one embodiment, the active second beneficial agricultural component 24 functions to "pre-condition" the plant's environment for the actions of the first beneficial agricultural component 18.

In one embodiment, the first beneficial agricultural component 18 is placed in the pores 16 by suspending the first beneficial agricultural component 18 in an aqueous solution, an oil or other suspension medium and then mixing it with a plurality of the porous particles 14. After a sufficient mixture time the porous particles 14 infused with the first beneficial agricultural component 18 are recovered from the suspension medium by filtration or other known separation methods. The recovered porous particles 14, now containing the first beneficial agricultural component 18 in the pores 16, are then coated with the protective sealant material by exposure to the protective sealant material sufficiently to form the protective sealant layer 12 on the functionalized particle 10.

The sealed functionalized particle 10 can then have the functionalized molecule 20 added if desired or this may be accomplished during the coating of the sealant protective material onto the functionalized particle 10 to form the protective sealant layer 12. The functionalized particle 10 can be delivered to the seeds or plants either as a liquid formulation or as a dry formulation. When the formulation is a liquid, the particle size and buoyancy are adjusted by proper selection of the protective sealant layer 12 and adjustment of its density so the functionalized particles 10 will remain in suspension. The formulation of the functionalized particles 10 is then applied to the seeds or to the plants as described herein. The protective sealant layer 12 can also be formulated to provide a timed release of the first and second beneficial agricultural components, 18 and 24, after application to the seeds or plants.

One can also combine a variety of functionalized particles 10, each formulated to contain different first beneficial agricultural components 18, to provide added benefits. These can also have the same or different second beneficial agricultural components 24. As discussed the functionalized particles 10 can be applied to seeds or to the plants or their environment by a variety of known application methods.

Crops and their seeds finding special use with the present invention include, but are not limited to: corn, alfalfa, rice, wheat, barley, oats, rye, cotton, sorghum, sunflower, peanut, potato, sweet potato, bean, pea, chicory, lettuce, endive, cabbage, brussel sprout, beet, parsnip, turnip, cauliflower, broccoli, radish, spinach, onion, garlic, eggplant, pepper, celery, carrot, squash, pumpkin, zucchini, cucumber, apple, pear, melon, citrus, strawberry, grape, raspberry, pineapple, soybean, tobacco, tomato, maize, clover, sugarcane, *Arabidopsis thaliana*, Saintpaulia, petunia, pelargonium, poinsettia, chrysanthemum, carnation, zinnia, roses, snapdragon, geranium, zinnia, lily, daylily, *Echinacea*, dahlia, hosta, tulip, daffodil, peony, phlox, herbs, ornamental shrubs, ornamental grasses, switchgrass, and turfgrass, or any other plant or seed or crop, or combinations thereof.

Another field wherein the functionalized particles 10 could find use is in delivery of microbes for use in bioremediation of chemical waste, bioremediation of contaminated soil, bioremediation of contaminated water, waste water treatment and cleanup of other damaged environmental areas. The functionalized particles 10 can also be used to deliver stabilized microbes in food applications such as brewing of beer, wine production and other food fermentation processes. The functionalized particles can also be used to deliver human or animal nutrients or medicines in topical or water-borne formulations. Additional uses could be in cosmetics, post-harvest storage and rot mitigation.

EXPERIMENTAL DATA

The materials used in the experiments were as follows. The expanded perlite particles used in all experiments was Harborlite® H200, which is an expanded perlite having a particle size of 17 microns and available from Harborlite Corporation. In all experiments the microbial species used as the beneficial agricultural component was spores of *Trichoderma atroviride* K5. In some experiments a combination of insecticide and fungicides was used. The Fungicide/Insecticide mixture, as it is designated, comprised: Imidacloprid insecticide, which is N-{1-[(6-chloro-3-pyridyl)methyl]-4,5-dihydroimidazol-2-yl}nitramide; Metalaxyl fungicide, which is methyl 2-[(2,6-dimethylphenyl)(methoxyacetyl)amino] propanoate; Fludioxonil fungicide, which is 4-(2,2-Difluoro-1,3-benzodioxol-4-yl)-1H-pyrrole-3-carbonitrile; and Azoxystrobin fungicide, which is Methyl (2E)-2-(2-{[6-(2-cyanophenoxy)pyrimidin-4-yl]oxy}phenyl)-3-methoxyacrylate. The crystal Tex™ 627M used to form a protective coating material is from tapioca starch and is available from Ingredion. It forms transparent films and is most often used in confectionary, bakery, cereal and snack applications. The water used in the experiments, unless noted otherwise, was reverse osmosis (RO) prepared water. The oil used in the experiments was a soybean oil. The carrageenan utilized in the experiments was the kappa carrageenan form. The filtration paper used in preparing the loaded perlite particles was Fisher Brand Qualitative P4 paper, a cellulose paper that retains particle of 4-8 microns in size or larger.

Figure 2:
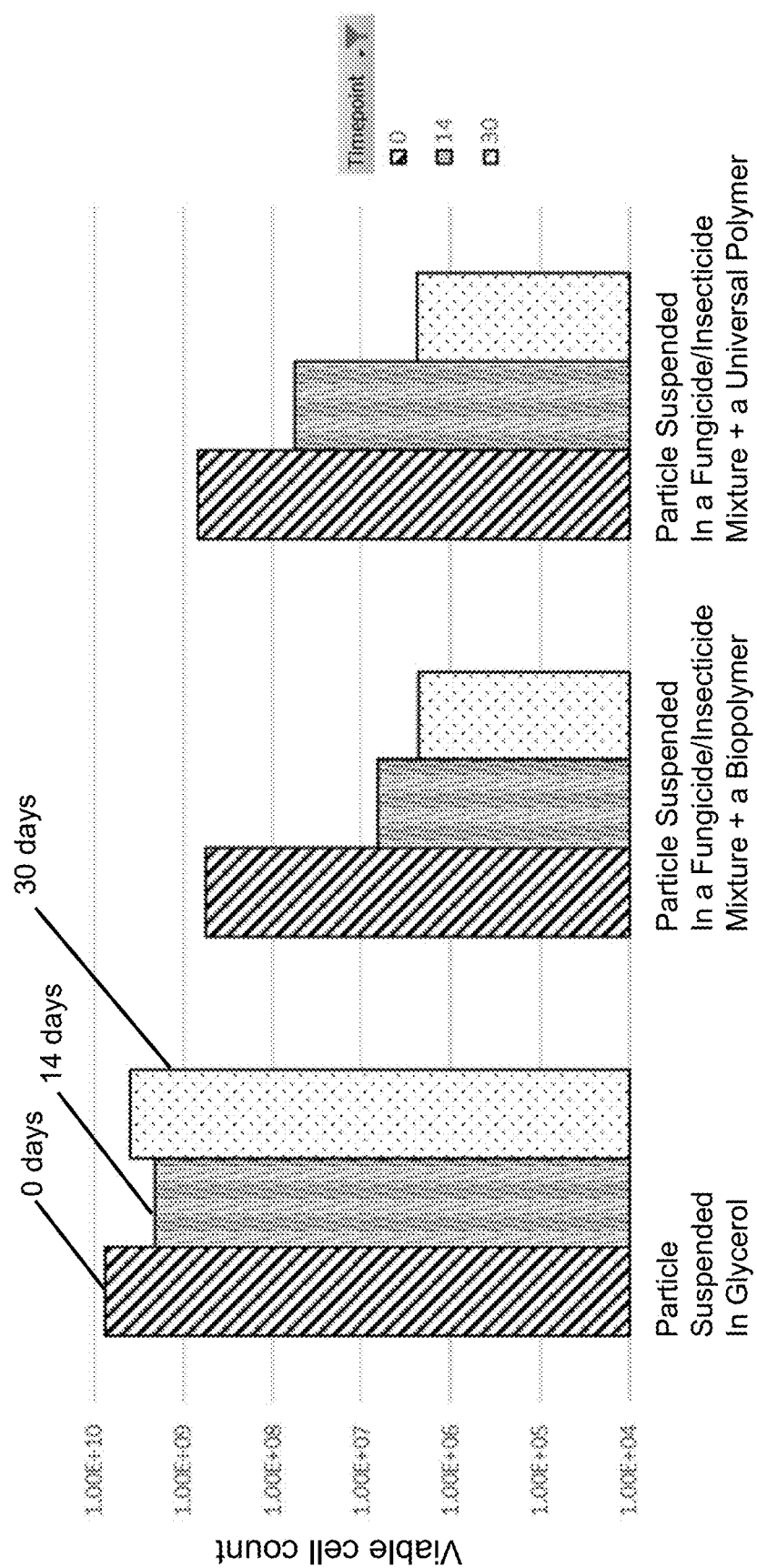
FIG. 2 is a graph showing the viability of *Trichoderma atroviride* K5 spores in functional particles prepared according to the present invention after suspension in a series of solutions over time.

In one experiment functionalized particles were prepared using the expanded perlite particles as the porous particle material. The spores of *Trichoderma atroviride* K5, 1 gram suspended in 100 ml of RO containing 20% by weight glycerol, were poured over the perlite particles on filter paper and then the particles were dried to form loaded particles. The loaded particles where then coated with a protective sealant layer comprising a 5% by weight corn starch solution prepared in RO water. The coated particles were then air dried before use. A first portion of the functionalized particles was suspended in glycerol, a second portion was suspended in a fungicide/insecticide mixture plus a biopolymer and a third portion was suspended in the fungicide/insecticide mixture plus a universal polymer. Then the number of viable cells in each suspension was determined at time 0, after 14 days and after 30 days storage at room temperature. The results are shown in FIG. 2. The fungicide/insecticide mixture was a combination of Imidacloprid, Metalaxyl, Fludioxonil and Azoxystrobin. The data shows that in the second and third portions the viability initially fell and then stabilized after 14 days. See FIG. 2.

In another series of experiments spores of *Trichoderma atroviride* K5 were loaded into expanded perlite particles followed by coating with a protective sealant layer as detailed below. The coated loaded particles were then suspended in a series of solutions and the number of viable cells over time was determined, the results are shown in FIG. 3 and FIG. 4.

The formulations 1C, 2C and 3C were prepared as follows. A spore suspension of *Trichoderma atroviride* K5 spores was prepared by combining 1 gram of spores with 100 ml of 20% by weight glycerol in RO water. This is the standard spore suspension used throughout the described experiments herein to load the perlite particles. For formulation 1C 12 grams of the perlite particles were placed onto a moistened filter paper and then 75 ml of the spore suspension was poured through the particles to form the *Trichoderma atroviride* K5 spore loaded perlite particles. The loaded perlite particles were then washed with a 50 ml rinse of RO water. A 5% by weight corn starch solution was prepared in RO water. Then 9.4 grams of the loaded perlite particles were combined with 0.384 ml of the 5% corn starch solution and the mixture was vortexed well. This comprises formulation 1C. Formulation 2C was prepared in the same manner as 1C, however it was air dried after the washing with 50 ml of RO water and prior to coating with the 5% corn starch solution as above. Formulation 3C was prepared in the same manner as formulation 2C, however the 5% corn starch coating was applied differently. The 5% corn starch solution was prepared as before, then it was air brush spray applied onto the loaded dried perlite particles. The application rate was 0.66 ml of the 5% corn suspension onto 16.5 grams of dried loaded perlite particles. These coated particles where then allowed to air dry.

Figure 3:
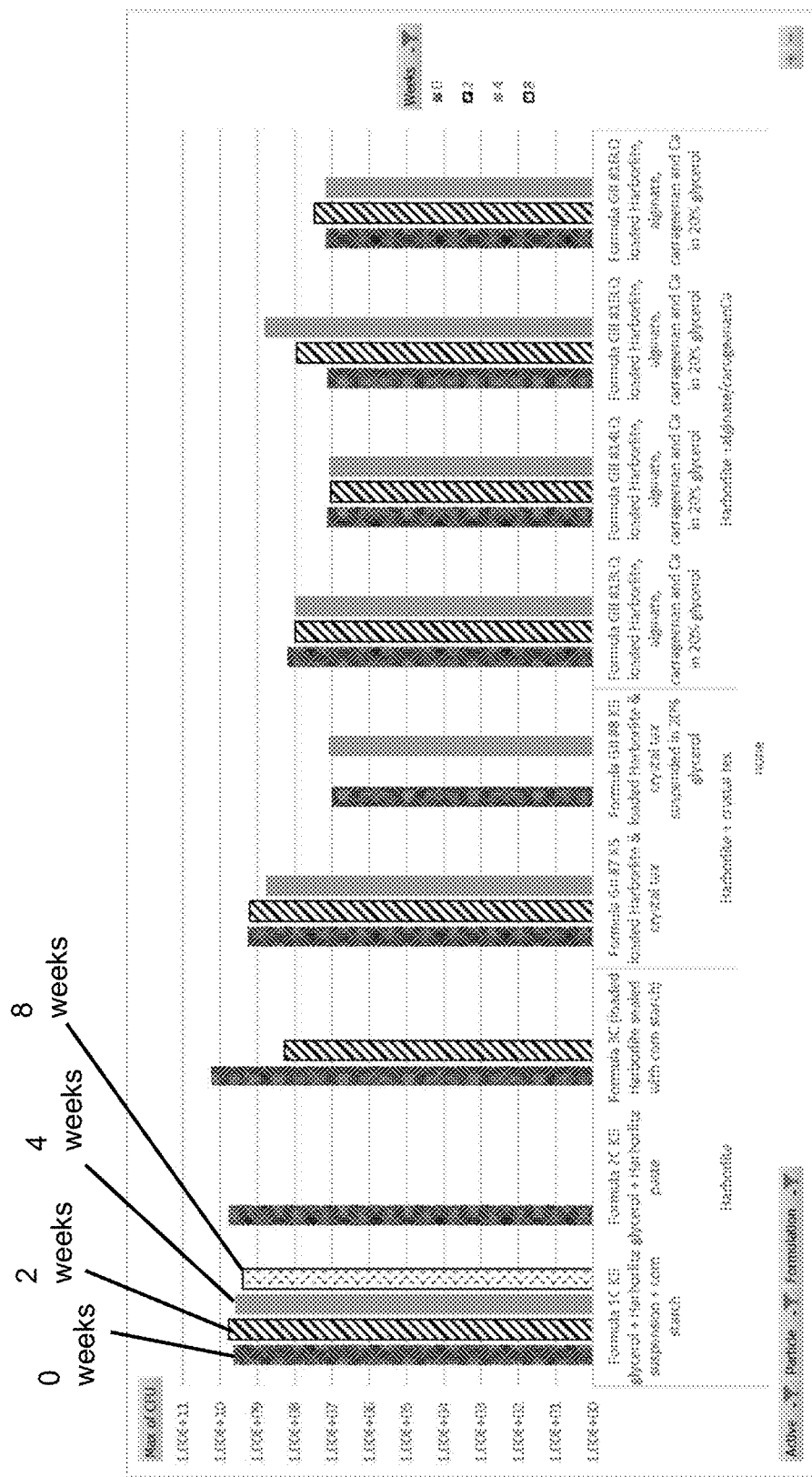
FIG. 3 is a graph showing the viability of *Trichoderma atroviride* K5 spores in functional particles prepared according to the present invention after suspension in a series of different solutions over time.
Figure 4:
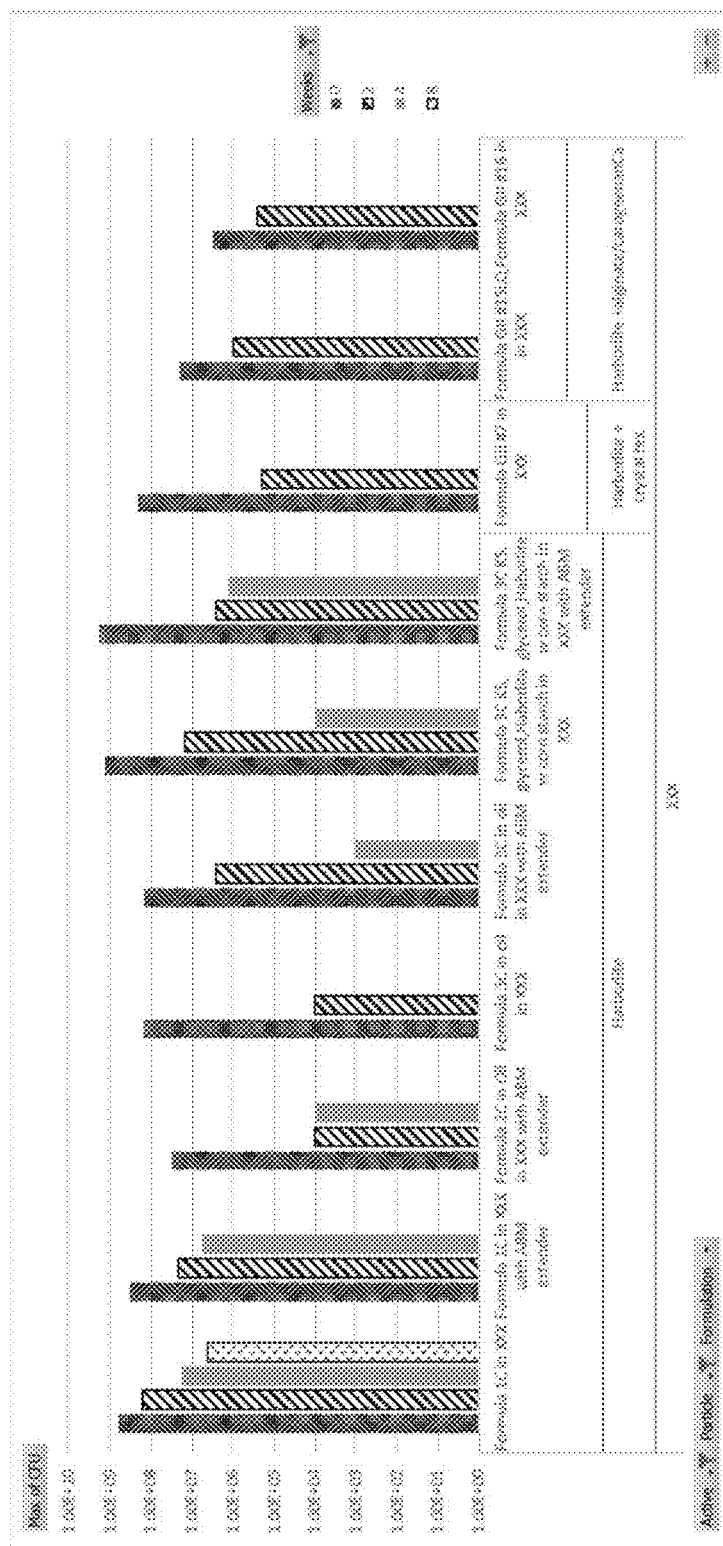
FIG. 4 is a graph showing the viability of *Trichoderma atroviride* K5 spores in functional particles prepared according to the present invention after suspension in a series of different solutions over time.

As shown in FIG. 3 the formulations 1C to 3C were fairly stable in terms of the number of viable cells over the period of time of from 0 to 8 weeks for the samples tested. The sample 1C was tested for the longest time period. In FIG. 4 these samples, 1C, 2C and 3C were tested in additional solutions. The formulation 1C was tested in either the Fungicide/Insecticide mixture, designated in FIG. 4 as XXX, or in XXX with Plus 30 Extender from Advanced Biological Marketing, Inc. It can be seen that the 1C formulation was stable in both tested solutions. The formulation 2C was tested in a mixture of soybean oil, XXX and ABM extender. It can be seen in FIG. 4 that this resulted in an initial drop in viability over the first 2 weeks but this drop was stable over the next 2 weeks, see FIG. 4. The formulation 3C was tested in a range of solutions as shown in FIG. 4. The test solutions were: a combination of soybean oil and XXX; a combination of soybean oil, XXX and ABM extender; in XXX alone; and in a combination of XXX and ABM extender. The results show that the best stability was achieved in the combination of XXX and ABM extender. In this combination there was an initial drop in viability at 2 weeks which was stable at 4 weeks. The other solutions all continued to show a drop in viability after the drop at 2 weeks. Note the sample in the combination of oil and XXX was only tested for 2 weeks.

The formulations GII #7, GII #8, GII #13LQ, GI #14LQ, GII #15LQ, and GI #16 were prepared as described herein. Formulation GII #7 was prepared as follows. An amount of 75 ml of the spore suspension in 20% glycerol as described above was poured over 12 grams of perlite particles on a filter paper to load the perlite particles. A 19% by weight solution of Crystal Tex™ 627M was prepared in RO water. Then 40 ml of the 19% Crystal Tex™ 627M solution was poured over the loaded perlite particles. The coated and loaded perlite particles were then allowed to air dry and as a final step the dried, coated, loaded perlite particles were further reduced in size by grinding with a mortar and pestle. Formulation GII #8 was prepared as follows. The spore suspension, 75 ml, was poured over 12 grams of expanded perlite particles on a filter paper. The particles were then rinsed with 50 ml of RO water and allowed to air dry. The dried and loaded perlite particles were then further crushed with a mortar and pestle. Then 6.2 grams of the crushed loaded perlite particles were exposed to 10 ml of the 19% Crystal Tex™ 627M solution by spray application. The coated loaded perlite particles were then allowed to dry. Formulation GII #13 was prepared as follows. The spore suspension, 100 ml, was poured over 12 grams of the perlite particles on a filter paper. A 1% by weight solution of alginate in RO water was prepared. A 0.5% by weight solution of $CaCl_2$) was prepared in RO water. To this 0.5% solution of $CaCl_2$) was added 1.5 grams of kappa carrageenan to form a solution of 0.5% by weight $CaCl_2$) and 1.0% by weight kappa carrageenan. Then 16.5 grams of loaded perlite particles were combined with 7 ml of the 1% alginate and 7 ml of the $CaCl_2$)/kappa carrageenan solution and the mixture was vortexed. The solution was then poured out and allowed to air dry. Formulation GII #14 was prepared the same as GII #13 with the following minor changes. First 10 grams of loaded perlite particles were combined with 5 ml of the 1% alginate and 5 ml of the $CaCl_2$)/kappa carrageenan solution and the mixture was vortexed. The solution was then poured out and allowed to air dry. Once dried the coated and loaded perlite particles were further crushed with a mortar and pestle. Formulation GII #15 was prepared as follows. The loaded perlite particles were prepared as described herein using 100 ml of spore suspension poured over 12 grams of perlite particles. Then 1.5 grams of loaded perlite particles were combined with 30 ml of the $CaCl_2$)/kappa carrageenan solution using a vortex. The suspension was then air dried. The air dried coated particles were then crushed with a mortar and pestle and then combined with 4 ml of the alginate solution. The mixture was then air dried and crushed again with mortar and pestle. Formulation GII #16 was prepared as follows. First 4.4 grams of loaded perlite particles, as described herein, were combined with 19.8 ml of the 1% alginate solution and vortexed. Then to this was added 19.8 ml of 0.5% $CaCl_2$) and 1.0% kappa carrageenan solution. The combination was vortexed well. The excess liquid was drained off and then the remaining solution was filtered using a 0.45 micron vacuum filtration. The resulting coated loaded perlite particles were then dried. The dried particles were then further crushed using a mortar and pestle.

Turning to FIG. 3, one sees that cell viability of cells in either the powder formulation GII #7 itself or the powder suspended in 20% by weight glycerol solution was tested for several weeks. The results in FIG. 3 show the cells were stable and viable in powder form for at least out to 4 weeks. Turing to FIG. 4 one sees the cells were not as viable for this formulation when the powder was suspended in XXX. Turning back to FIG. 3 one finds that when the powdered formulation GII #8 was suspended in 20% glycerol it was stable for at least 4 weeks with no loss of viability. Turning to FIG. 3 one sees the viability over time of the powder formulations of GII #13LQ, GII #14LQ, GII #15LQ and GII #16 over time after resuspension in 20% glycerol. All of the formulations showed stability of cell number for at least 4 weeks, with formulation GII #15 even showing somewhat of an increase over time. Turning to FIG. 4 one finds that the powdered formulations GII #15 and GII #16 were not quite as stable in XXX over time.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

We claim:

1. A functionalized particle comprising:
   a porous expanded perlite particle having a diameter of 17 microns or less and comprising a plurality of pores and at least one first beneficial agricultural component located within said pores, said first beneficial agricultural component comprising at least one viable microorganism; and
   a protective sealant layer, said sealant layer surrounding and fully encasing said porous particle and said at least one first beneficial agricultural component.

2. The functionalized particle as recited in claim 1 wherein said porous expanded perlite particle has a diameter of 15 microns or less.

3. The functionalized particle as recited in claim 1 wherein said at least one first beneficial agricultural component located within said pores further comprises at least one of a nutrient, a functional molecule, or a mixture thereof.

4. The functionalized particle as recited in claim 1 wherein said at least one viable microorganism is selected from the group consisting of *Trichoderma* spp., *Bacillus* spp., *Rhizobia* spp., *Bradyrhizobium* spp., *Burkholderia* spp., *Pseudomonas* spp., *Xanthomonas* spp., *Streptomyces* spp., *Azosporillum* spp., *Clonostachys* spp., other gram negative bacteria, other gram positive bacteria and mixtures thereof.

5. The functionalized particle as recited in claim 3 wherein said at least one first beneficial agricultural component further comprises at least one nutrient selected from the group consisting of a fertilizer mixture, a micronutrient, humic acids, fulvic acids, salts, peat extract, and mixtures thereof.

6. The functionalized particle as recited in claim 3 wherein said at least one first beneficial agricultural component further comprises at least one functional molecule selected from the group consisting of chitosan, microbial metabolites, plant signal molecules, plant signal hormones, dsRNA, antisenseRNA, nucleic acids, proteins, plant extracts, microbial extracts, spent microbial media, microbial signal molecules, biofunctional molecules, effector molecules, virus particles, plasmids, stabilized macromolecules, chelators, buffers, and mixtures thereof.

7. The functionalized particle as recited in claim 1 wherein said protective sealant layer encasing said porous particle comprises at least one component selected from the group consisting of starch, carrageenan, alginate, guar gum, agar, gelatin, polyacrylamide, wax, oil, a natural polymer, a synthetic polymer and mixtures thereof.

8. The functionalized particle as recited in claim 1 further comprising a plurality of functionalized molecules embedded in said protective sealant layer.

9. The functionalized particle as recited in claim 8 wherein said plurality of functionalized molecules each comprise a base material and an active second beneficial agricultural component.

10. The functionalized particle as recited in claim 9 wherein said active second beneficial agricultural component is selected from the group consisting of viable microorganisms, nutrients, functional molecules, and mixtures thereof.

11. The functionalized particle as recited in claim 10 wherein said active second beneficial agricultural component is a viable microorganism selected from the group consisting of *Trichoderma* spp., *Bacillus* spp., *Rhizobia* spp., *Bradyrhizobium* spp., *Burkholderia* spp., *Pseudomonas* spp., *Xanthomonas* spp., *Streptomyces* spp., *Azosporillum* spp., *Clonostachys* spp., other gram negative bacteria, other gram positive bacteria and mixtures thereof.

12. The functionalized particle as recited in claim 10 wherein said active second beneficial agricultural component is a nutrient selected from the group consisting of fertilizer mixtures, micronutrients, humic acids, fulvic acids, salts, peat extract, and mixtures thereof.

13. The functionalized particle as recited in claim 10 wherein said active second beneficial agricultural component is a functional molecule selected from the group consisting of chitosan, microbial metabolites, plant signal molecules, plant signal hormones, dsRNA, antisenseRNA, nucleic acids, proteins, plant extracts, microbial extracts, spent microbial media, microbial signal molecules, biofunctional molecules, effector molecules, virus particles, plasmids, stabilized macromolecules, chelators, buffers, and mixtures thereof.

14. The functionalized particle as recited in claim 9 wherein said first beneficial agricultural component and said active second beneficial agricultural component are the same.

15. The functionalized particle as recited in claim 9 wherein said first beneficial agricultural component and said active second beneficial agricultural component are different.

16. A method of treating a plant seed comprising the steps of:
   a) providing a plant seed; and
   b) applying the functionalized particle of claim 1 to the seed.

17. The method according to claim 16 wherein step a) comprises providing a plant seed selected from the group consisting of corn, alfalfa, rice, wheat, barley, oats, rye, cotton, sorghum, sunflower, peanut, potato, sweet potato, bean, pea, chicory, lettuce, endive, cabbage, brussel sprout, beet, parsnip, turnip, cauliflower, broccoli, radish, spinach, onion, garlic, eggplant, pepper, celery, carrot, squash, pumpkin, zucchini, cucumber, apple, pear, melon, citrus, strawberry, grape, raspberry, pineapple, soybean, tobacco, tomato, maize, clover, sugarcane, *Arabidopsis thaliana, Saintpaulia, petunia, pelargonium, poinsettia, chrysanthemum*, carnation, *zinnia*, roses, snapdragon, geranium, *zinnia*, lily, daylily, *Echinacea*, dahlia, hosta, tulip, daffodil, peony, *phlox*, herbs, ornamental shrubs, ornamental grasses, switchgrass, turfgrass, or combinations thereof.

18. A method of treating a plant comprising the steps of:
   a) providing a plant; and
   b) applying the functionalized particle of claim 1 to the plant.

19. The method according to claim 18 wherein step a) comprises providing a plant selected from the group consisting of corn, alfalfa, rice, wheat, barley, oats, rye, cotton, sorghum, sunflower, peanut, potato, sweet potato, bean, pea, chicory, lettuce, endive, cabbage, brussel sprout, beet, parsnip, turnip, cauliflower, broccoli, radish, spinach, onion, garlic, eggplant, pepper, celery, carrot, squash, pumpkin, zucchini, cucumber, apple, pear, melon, citrus, strawberry, grape, raspberry, pineapple, soybean, tobacco, tomato, maize, clover, sugarcane, *Arabidopsis thaliana*, *Saintpaulia*, *petunia*, *pelargonium*, *poinsettia*, *chrysanthemum*, carnation, *zinnia*, roses, snapdragon, geranium, *zinnia*, lily, daylily, *Echinacea*, dahlia, hosta, tulip, daffodil, peony, *phlox*, herbs, ornamental shrubs, ornamental grasses, switchgrass, turfgrass, or combinations thereof.

* * * * *